United States Patent
Efremov

(10) Patent No.: US 9,081,896 B1
(45) Date of Patent: Jul. 14, 2015

(54) GENERATING A REPLACEMENT BINARY FOR EMULATION OF AN APPLICATION

(75) Inventor: Venelin N. Efremov, Rancho Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 13/426,003

(22) Filed: Mar. 21, 2012

(51) Int. Cl.
*G06F 9/45* (2006.01)
*G06F 11/36* (2006.01)
*G06F 11/34* (2006.01)

(52) U.S. Cl.
CPC ........ *G06F 11/3664* (2013.01); *G06F 11/3466* (2013.01)

(58) Field of Classification Search
CPC ........... G06F 9/44; G06F 9/50; G06F 11/261; G06F 11/30; G06F 11/3457; G06F 11/3466; G06F 8/30; G06F 9/455
See application file for complete search history.

(56) References Cited

U.S. PATENT DOCUMENTS

| | | | | |
|---|---|---|---|---|
| 5,751,982 | A * | 5/1998 | Morley | 712/209 |
| 5,838,948 | A * | 11/1998 | Bunza | 703/27 |
| 6,363,436 | B1 * | 3/2002 | Hagy et al. | 719/331 |
| 2005/0071824 | A1 * | 3/2005 | K. N. et al. | 717/138 |
| 2007/0006184 | A1 * | 1/2007 | Andrews et al. | 717/136 |
| 2008/0115119 | A1 * | 5/2008 | Lagergren | 717/148 |
| 2009/0089762 | A1 * | 4/2009 | Micco et al. | 717/137 |
| 2009/0094015 | A1 * | 4/2009 | Irving et al. | 703/26 |
| 2012/0296626 | A1 * | 11/2012 | Bond et al. | 703/26 |
| 2013/0096908 | A1 * | 4/2013 | Cook et al. | 703/26 |

OTHER PUBLICATIONS

Erik R. Altman et al.; Welcome to the Opportunities of Binary Translation; 2000 IEEE; pp. 40-44; <http://www.computer.org/csdl/mags/co/2000/03/r3040.pdf>.*
I. Mavroidis et al.; Efficient Testbench Code Synthesis for a Hardware Emulator System; 2007 ACM; pp. 888-893; <http://d1.acm.org/citation.cfm?id=1266558>.*
Claude Helmstetter et al.; SimSoC A SystemC TLM integrated ISS for full system simulation; 2008 IEEE; pp. 1759-1762; <http://ieeexplore.ieee.org/stamp/stamp.jsp?tp=&arnumber=4746381>.*
David Ung et al.; Walkabout a retargetable dynamic binary translation framework; 2002 ACM; 33 pages; <http://d1.acm.org/citation.cfm?id=1698152>.*
Peter Magnusson et al.; Efficient Memory Simulation in SIMIC; 1995 IEEE; pp. 62-73; <http://ieeexplore.ieee.org/stamp/stamp.jsp?tp=&arnumber=393593>.*
Kristy Andrews et al.; Migrating a CISC computer family onto RISC via object code translation; 1992 ACM; pp. 213-222; <http://d1.acm.org/citation.cfm?id=143520>.*

* cited by examiner

*Primary Examiner* — Thuy Dao
*Assistant Examiner* — Cuong V Luu
(74) *Attorney, Agent, or Firm* — Thomas | Horstemeyer, LLP

(57) ABSTRACT

Disclosed are various embodiments for generating a replacement binary for emulation of an application. A computer ingests native object code and identifies a central processing unit (CPU) from the native object code. The computer transforms the native object code to produce replacement object code. When executed on the computing device, the replacement code invokes an emulator for the CPU to execute the native code.

21 Claims, 5 Drawing Sheets

GENERATING A REPLACEMENT BINARY FOR EMULATION OF AN APPLICATION

BACKGROUND

Software emulation allows an application designed for one type of hardware platform to be executed on another type of hardware platform. Remote or streaming execution provides emulation of an application and further provides the input and output to be redirected, from the computing device that performs the emulation to a client device. Using streaming execution, a customer can execute applications for hardware different from his own device without having to buy the hardware platform or the emulation software.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
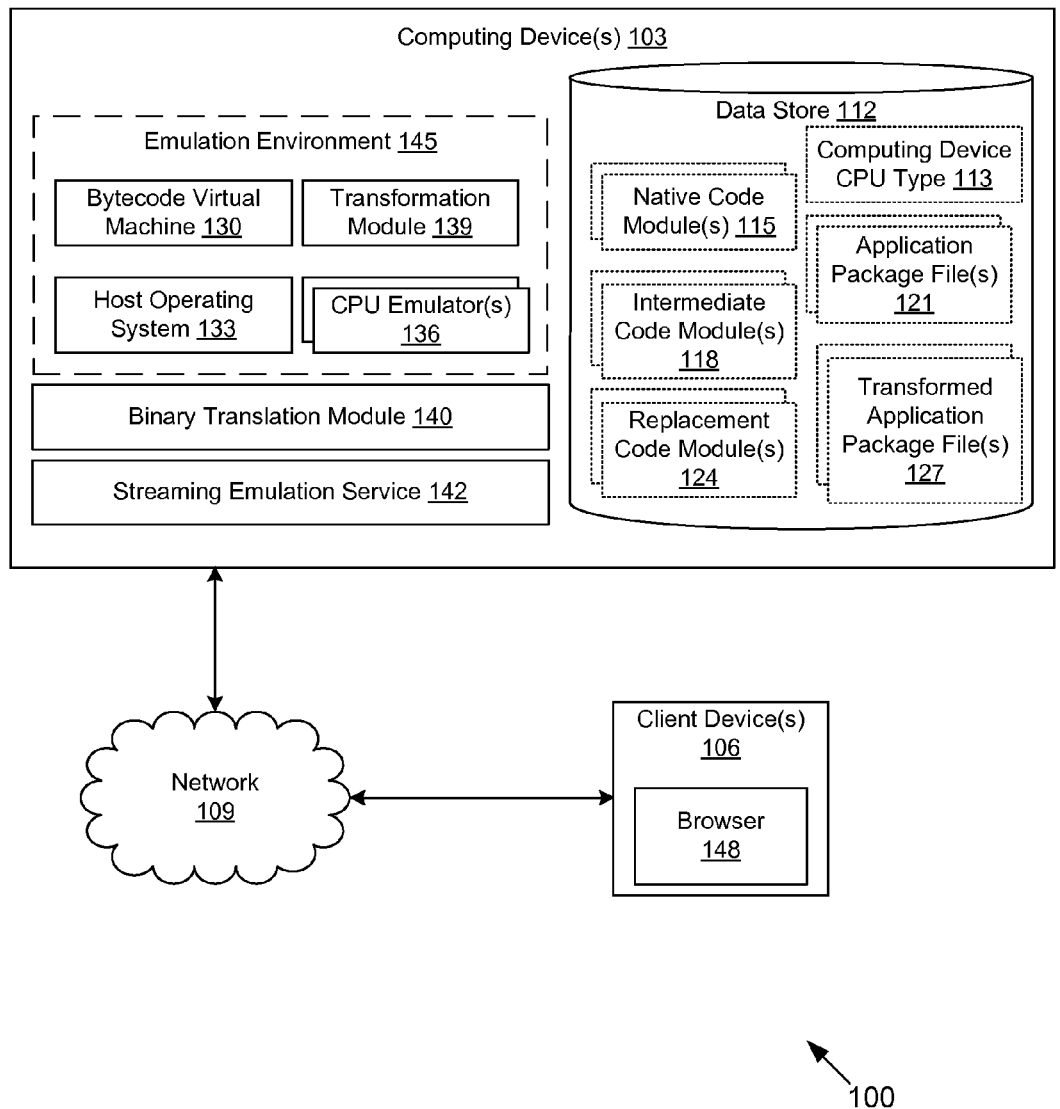
FIG. 1 is a drawing of a networked environment according to various embodiments of the present disclosure.

The present disclosure relates to emulation of software applications. A service provider may wish to allow users to remotely execute an application so that a user can, for example, play a game that requires hardware that is different from his own device. In some cases, the hardware required by the application is also different than that used by the service provider. If the service provider has access to the source code for the application, the application may be adapted or ported to match the hardware platform used by the service provider. However, developers do not always make the source code available. In such cases, the service provider may emulate the application instead. The service provide can further provide streaming execution in connection with this emulation so that the application input and output is redirected from the computing device that performs the emulation to a client device.

The present disclosure uses emulation in conjunction with a process that transforms the original application before emulation.

In various embodiments disclosed herein, an emulation environment executing on a computing device includes a bytecode virtual machine layered above a host operating system. The host operating system is written for, or matches, the particular processor on which the emulation environment executes. The bytecode virtual machine in conjunction with the host operating system allows applications composed only of intermediate, or platform-agnostic, code to execute without emulation the operating system, since the host operating system matches the processor on which it executes.

Various embodiments of the emulation environment described herein also include a platform emulator for a target hardware platform, where the target hardware platform includes a target processor different than the processor used by the host operating system. The emulation environment also includes a transformation module that processes the application to be emulated before emulation, in order to generate replacement code for any native code present in the application to be emulated. Native code refers to code that is specific to a hardware platform. The transformation process can be performed once and the application executed multiple times on the computing device. That is, the transformation is not required to be performed every time the application is executed.

When the application to be emulated is executed, the replacement code invokes an emulator. The emulator may in turn invoke host operating system if necessary. The replacement code also returns values from the emulator back to the application. Thus, the transformation module in conjunction with the platform emulator allows emulation of applications that include native, or platform-specific code, in combination with intermediate code. The intermediate code is executed by the bytecode virtual machine, while the emulator executes replacement application code that was generated by the transformation module based on the application to be emulated.

The applications to be emulated may be provided in a binary format. The binary format may be implemented as a shared library, and the shared library may be packaged in an application package file. In the following discussion, a general description of the system and its components is provided, followed by a discussion of the operation of the same.

With reference to FIG. 1, shown is a networked environment 100 according to various embodiments. The networked environment 100 includes one or more computing devices 103 in data communication with one or more client devices 106 by way of a network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below. The data stored in the data store 112 may include, for example, computing device central processing unit (CPU) type 113, native code modules 115, intermediate code modules 118, application package files 121, replacement code modules 124, and transformed application package files 127, as well as potentially other data.

The components executed on the computing device 103 include, for example, a bytecode virtual machine 130, a host operating system 133, one or more central processing unit (CPU) emulators 136, a transformation module 139, and a binary translation module 140. In some embodiment, the components executed on the computing device 103 also include a streaming emulation service 142. The components executed on the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

The bytecode virtual machine 130 is executed to provide a run time hosted environment for intermediate code. Code that is agnostic with respect to the type of processor and hardware platform is referred to herein as intermediate code. Intermediate code executes without regard to processor or platform by executing within the context of a bytecode virtual machine 130. Intermediate code may take the form of bytecode, for example Java bytecode. In some embodiments, the bytecode virtual machine 130 is implemented as a Java® virtual machine. In contrast, code that is specific to a processor or a hardware platform is referred to herein as native code. Native code may conform to a particular interface, such as Java® Native Interface (JNI) if written in Java®, or Platform/Invoke (PInvoke) if written in C#.

The host operating system 133 is executed to provide operating system services such as memory management, task scheduling, device driver access, etc., for the bytecode virtual machine 130 and/or the CPU emulator 136. Thus, the bytecode virtual machine 130 can be viewed as being layered above the host operating system 133, and the host operating system 133 as layered above the host processor and the host hardware platform of the computing device 103.

A CPU emulator 136 executes on the computing device 103 to provide emulation of various applications that are designed to execute on a target CPU different than the CPU of the computing device 103. For example, the CPU emulator 136 may provide emulation of an ARM processor while executing on a computing device 103 that uses the Intel® x86 processor. Thus, the platform emulator 136 allows code specific to one processor to execute on a different processor. The computing device 103 may include multiple CPU emulators 136 so that more than one type of CPU can be emulated.

In some embodiments, the CPU emulator 136 may provide emulation of an entire hardware platform, including various peripheral devices which make up the hardware platform. In such embodiments, the CPU emulator 136 may be viewed as a platform emulator and may include a processor emulator module as well as various device emulation modules. When emulating an entire platform, the emulator 136 may use the services of an operating system such as the host operating system 133. For example, an emulator 136 specific to the Android™ operating system may map calls to an Android™ memory management service to a corresponding memory management service provided by a host operating system 133 such as Linux. In this manner, the platform emulator may provide emulation of an entire Android™ hardware platform, which uses the ARM processor and the Android™ operating system, while executing on a computing device 103 that uses the Intel® x86 processor and a Linux operating system.

Emulation of an entire hardware platform may be useful when executing applications that interact directly with hardware. If applications instead use the services of the host operating system 133 to access hardware and do not access hardware directly, emulation of the CPU is sufficient, as should be appreciated.

The transformation module 139 is executed to generate code that replaces native code with replacement code that invokes the CPU emulator 136. Thus, the transformation module 139 allows the computing device 103 to execute applications that include native code for a platform different than the computing device 103, and that also include intermediate code. The intermediate code portion of the application under emulation executes within the bytecode virtual machine 130, and the replacement code module 124 executes on the CPU emulator 136. Without the transformation module 139, an application including native code for a different platform and also including intermediate code would not properly execute on the computing device 103.

The binary translation module 140 may be executed to translate executable code for a source CPU into executable code for a target CPU. For example, in an embodiment in which the application to be emulated is written for an ARM processor and computing device 103 includes an Intel® x86 processor, the binary translation module 140 may generate translate the ARM instructions to x86 instructions. The computing device 130 may include multiple binary translation modules 140 to handle various combinations of source and target CPU (e.g., ARM to x86, x86 to ARM, PowerPC to x86, x86 to PowerPC, etc.).

The streaming emulation service 142 is executed to provide streaming emulation or remote emulation of applications executing on the computing device 103. The streaming emulation service 142 provides these services by interacting with the emulation environment 145 formed by the bytecode virtual machine 130, the host operating system 133, the CPU emulator 136, and the transformation module 139. The application executes in the emulation environment 145, and the streaming emulation service 142 redirects the output of the emulated application to appear on a client device 106 rather than on a display attached to the computing device 103. Similarly, the streaming emulation service 142 redirects the input of the emulated application to be received from a client device 106 rather than from a keyboard or other input device attached to the computing device 103.

In other environments, the emulation environment 145 is used without the streaming emulation service 142. In such embodiments, output from the emulated application is displayed locally at the computing device 103 and input from emulated application is received locally from input device(s) of the computing device 103.

Having discussed various components of the computing device 103, the client device 106 will now be discussed. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability.

The client device 106 may be configured to execute various applications such as a browser 148 and other applications. The browser 148 may be executed in a client device 106, for example, to access and render network pages, such as web pages, or other network content served up by a web server, a page server, or other servers. In some embodiments, the network content originates from one of the computing devices 103. The client device 106 may be configured to execute applications beyond browser 148 such as, for example, email applications, instant message applications, and/or other applications.

Next, a general description of the operation of the various components of the networked environment 100 is provided. To begin, a user of the client device 106 requests, from the computing device 103, execution of an application contained within an application package file 121. This request may be serviced by the streaming emulation service 142. The computing device 103 determines that the requested application is not native to the computing device 103, that is, the application is designed for a hardware platform different than the computing device 103. The computing device 103 further determines whether the application also includes intermediate code.

If both conditions are met, the streaming emulation service 142 determines whether the transformation module 139 has already generated a replacement code module 124 corresponding to the requested application. If not, the transformation module 139 invokes the transformation module 139 to generate another version of the application package file 121, one that includes an appropriate replacement code module 124 and that will therefore, in conjunction with the CPU emulator 136, execute properly on the computing device 103. The transformation process will be described in further detail below in conjunction with FIGS. 2, 3, and 4.

Once a replacement or transformed application package file 127 has been generated by the transformation module 139, the streaming emulation service 142 cooperates with the emulation environment 145 to execute the transformed application package file 127 on the computing device 103. As noted above, the streaming emulation service 142 redirects input and output of the emulated application to the client device 106. Thus, application appears to be executing locally on the client device 106, but is actually being remotely emulated by the computing device 103.

Figure 2:
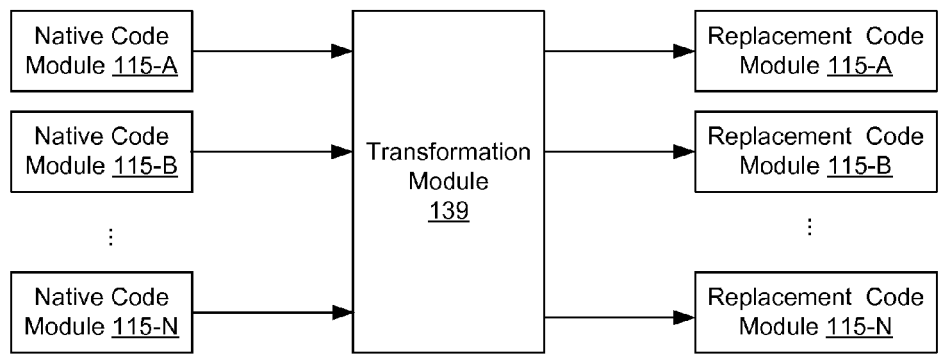
FIG. 2 is a data flow diagram illustrating an example of the operation of a transformation module executed in a computing device in the networked environment of FIG. 1, according to various embodiments of the present disclosure.

Referring next to FIG. 2, shown is data flow diagram illustrating one example of the operation of the transformation module 139 of FIG. 1, according to various embodiments of the present disclosure. To begin, the transformation module 139 ingests one or more native code modules 115A-N, which may be stored in the data store 112. In some embodiments, a native code module 115 takes the form of a shared library, which can use various formats such as Executable and Linkable Format (ELF), Mach-O, and Process Executable (PE). The transformation module 139 then transforms each native code module 115 to produce a corresponding replacement code module 124. In some embodiments, a replacement code module 124 takes the form of a shared library, one that is separate from the shared library in which the native code module 115 resides.

A replacement code module 124 includes code that, when executed on a computing device 103, invokes a CPU emulator 136 (also executing on the computing device 103) and further causes the CPU emulator 136 to execute code in the native code module 115. Thus, where execution of the native code module 115 causes the hardware platform to take certain actions, execution of the corresponding replacement code module 124 causes the CPU emulator 136 to perform equivalent actions.

In some embodiments, the replacement code module 124, when executed on the computing device 103, provides parameters to the CPU emulator 136, where these parameters were provided by the native code module 115. In some embodiments, the replacement code module 124, when executed on the computing device 103, obtains a result obtained from invoking the CPU emulator 136 and returns that result to the caller of the replacement code. The replacement code module 124 thus performs a two-way function. First, the replacement code module 124 is called by an intermediate code module 118 and the replacement code module 124 in turn passes parameters to the CPU emulator 136. Next, when the CPU emulator 136 returns, the replacement code module 124 returns the result to its caller. In some embodiments, the replacement code module 124 is invoked by the bytecode virtual machine 130 and the replacement code module 124 returns the result provided by the CPU emulator 136 to the bytecode virtual machine 130.

To generate the replacement code module 124, the transformation module 139 first parses the native code module 115 to identify a list of native methods that are contained within, and exported by, the native code module 115. The transformation module 139 may use various mechanisms for determining that an exported method is a native method. Some of these identification methods may be platform dependent. For example, native code that conforms to Java® Native Interface (JNI) uses a predefined name format for exported native methods. The JNI name for an exported native function takes the form of a concatenated string containing: the prefix "Java_"; a mangled fully-qualified class name; an underscore ("_") separator; a mangled method name; and (for overloaded native methods), two underscores ("__") followed by the mangled argument signature.

Having identified the native methods in the native code module 115, the transformation module 139 creates a stub native method for each of the native methods. A stub native method has the same name as the native method in the native code module 115. The transformation module 139 then fills in the stub native method with code that, when executed on a computing device 103, invokes a CPU emulator 136 (also executing on the computing device 103) and also causes the CPU emulator 136 to execute code in the native code module 115. As a result, when the computing device 103 executes the replacement code module 124, the emulator 136 first executes the processor instructions in the native code module 115 and then provides the result of the emulated processor instructions to the replacement code module 124.

The code to invoke the CPU emulator 136 may be emulator specific and/or platform specific. For example, a software trap instruction may be used to invoke the CPU emulator 136. The location of the code to be emulated may be passed as a parameter to the CPU emulator 136. In some embodiments, the CPU emulator 136 loads the native method from the shared library containing the native code module 115.

Having generated a replacement native method for each native method in the native code module 115, the transformation module 139 adds these replacement native methods to the replacement code module 124. In some embodiments, the replacement code module 124 is included in a shared library. The transformation module 139 may generate a single shared library that includes replacement code from multiple replacement code modules 124, or may generate a different shared library for each replacement code module 124.

Figure 3:
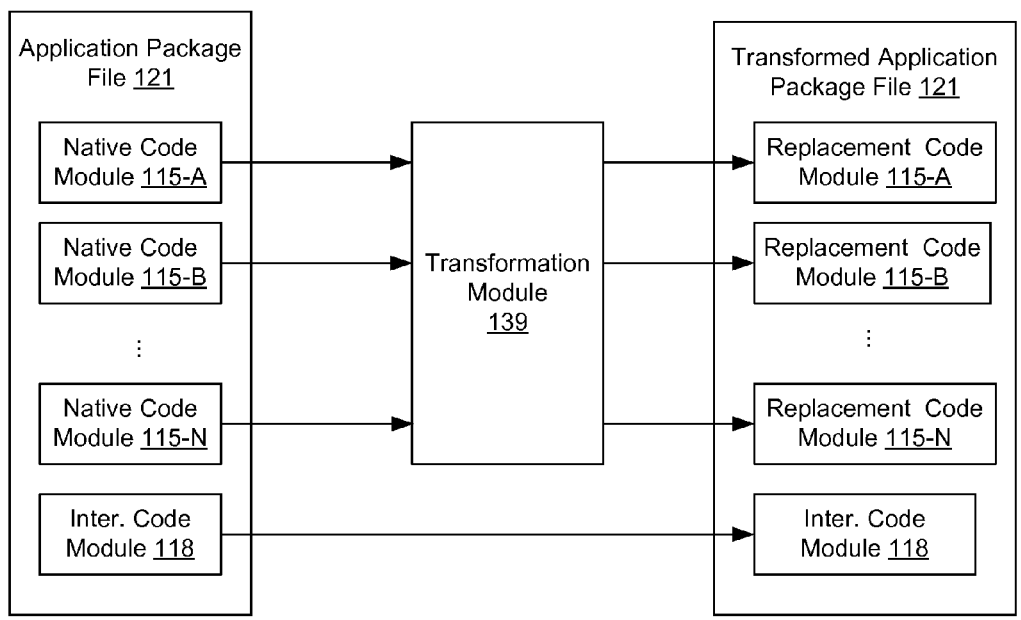
FIG. 3 is a data flow diagram illustrating another example of the operation of a transformation module executed in a computing device in the networked environment of FIG. 1, according to various embodiments of the present disclosure.

Moving on to FIG. 3, shown is data flow diagram illustrating another example of the transformation module 139 of FIG. 1, according to various embodiments of the present disclosure. To begin, the transformation module 139 obtains an application package file 121 from the data store 112. The application package file 121 may be an archive file that supports a hierarchical directory structure. In some embodiments, an application package file 121 is based on the Java Archive (JAR) file format and/or is compressed using the ZIP file format. The transformation module 139 then parses the application package file 121 to identify native code modules 115 and intermediate code modules 118. These code modules may take the form of object code files or shared library files.

The transformation module 139 then uses the techniques described herein to transform each native code module 115 into a corresponding replacement code module 124. As noted above, a replacement code module 124 includes code that, when executed on a computing device 103, invokes a CPU emulator 136 (also executing on the computing device 103) and also causes the CPU emulator 136 to emulate code in the native code module 115.

Having generated one or more replacement code modules 124, the transformation module 139 adds the replacement code modules 124 to the application package file 121 to produce a transformed application package file 127. The location of the replacement code modules 124 within the application package file 121 is platform-specific. For example, the name of the directory which stores the replacement code modules 124 may be based on the processor type and/or platform type (e.g., "lib\armeabi"). In some embodiments, the transformation module 139 leaves untouched the native code modules 115 in the application package file 121, so that the transformed application package file 127 includes the original native code modules 115 from the original application package file 121, along with additional corresponding replacement code modules 124.

Figure 4:
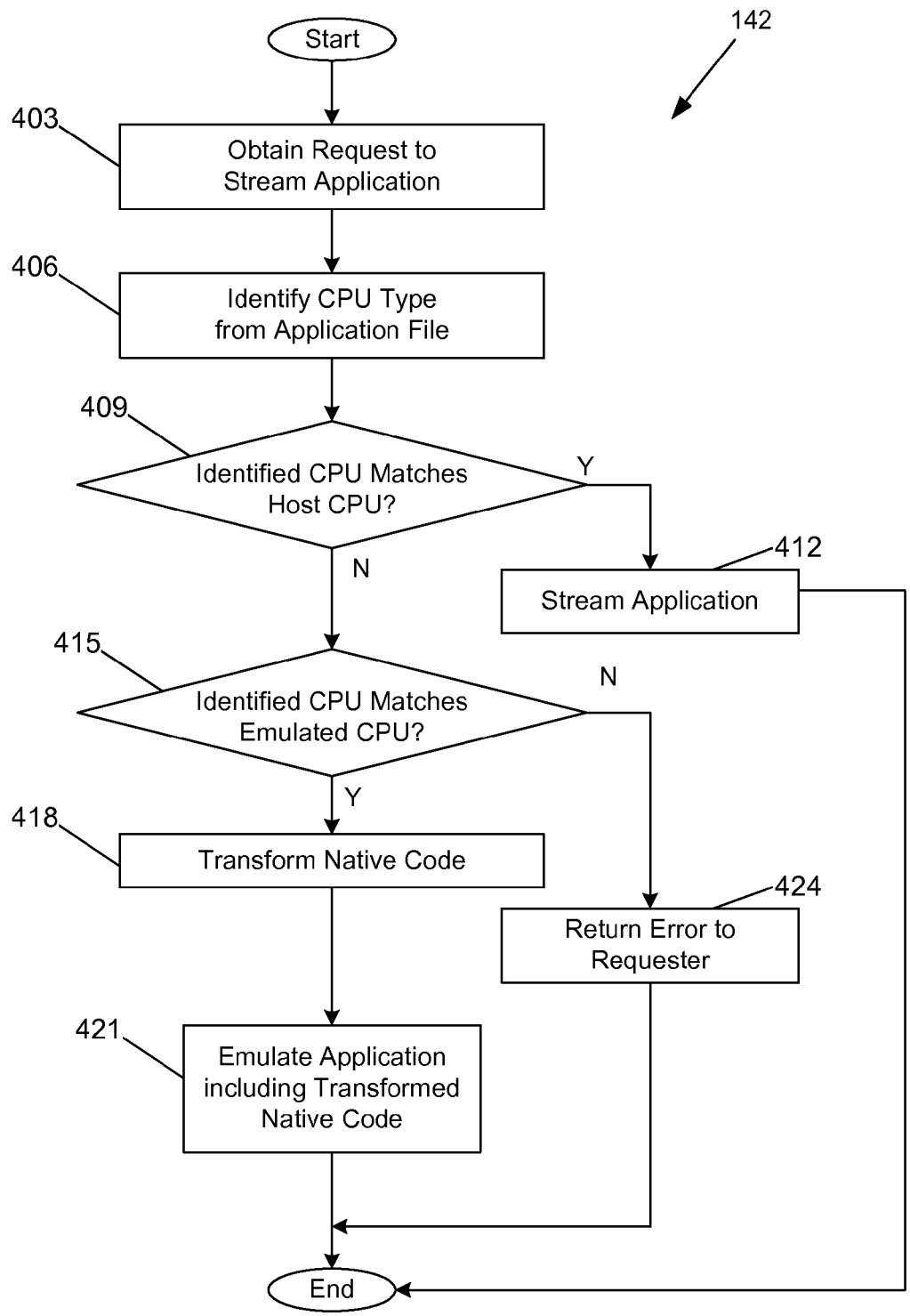
FIG. 4 is a flowchart illustrating an example of functionality implemented as portions of a streaming emulation service executed in a computing device in the networked environment of FIG. 1 according to various embodiments of the present disclosure.

With reference now to FIG. 4, shown is a flowchart that provides one example of the operation of a portion of the streaming emulation service 142 according to various embodiments. It is understood that the flowchart of FIG. 4 provides merely an example of the many different types of functional arrangements that may be employed to implement the operation of the portion of the streaming emulation service 142 as described herein. As an alternative, the flowchart of FIG. 4 may be viewed as depicting an example of steps of a method implemented in the computing device 103 (FIG. 1) according to one or more embodiments.

Beginning at box 403, the streaming emulation service 142 obtains a request from a client device 106 (FIG. 1) to stream a particular application. Next, at box 406, the streaming emulation service 142 locates the application package file 121 (FIG. 1) that corresponds to the requested application and examines the application package file 121, or components within the application package file 121, to identify the type of processor required to execute the application. In some embodiments, the processor type may correspond to a processor architecture or family rather than a specific manufacturer, model, version or stepping. For example, the streaming emulation service 142 may identify the processor type as x86 rather a more specific identification such as Intel Celeron® or AMD K5®. As another example, the service 142 may identify the processor type as 32-bit x86 rather than Intel 80386, 80486, or Pentium®.

Next, at box 409, the streaming emulation service 142 determines whether the processor type of the application package file 121 matches the type of the host processor of the computing device 103. This information may be determined once and stored in the data store 112 (FIG. 1) as CPU type 113 (FIG. 1). The service 142 may determine the host processor type in various ways, for example, by a call to an operating system service, from a registry database, from stored configuration information, or through various other mechanisms.

If the processor in the application package file 121 matches the host processor type, then processing continues at box 412, where the streaming emulation service 142 provides remote execution of the requested application. When the application is finished executing, the process of FIG. 4 is complete. Techniques for remote execution are described in the following commonly assigned applications, each of which is hereby incorporated in its entirety: Ser. No. 12/968,845 ("Sending Application Input Commands over a Network"); Ser. No. 13/099,753 ("Reducing Latency for Remotely Executed Applications"); and Ser. No. 13/114,534 ("Remotely Emulating Computing Devices").

If, however, it is determined at box 409 that the application package file 121 does not match the host processor type, then processing continues at box 415, where a further comparison is performed. At box 415, the streaming emulation service 142 determines whether the processor type of the application package file 121 matches one of the CPU emulators 136 (FIG. 1) executing on the computing device 103. If the processor in the application package file 121 matches an emulator 136, then processing continues at box 418, where the transformation module 139 (FIG. 1) is invoked to transform the application code as appropriate, using techniques described herein. In some embodiments, the transformation module 139 may be provided with a parameter that indicates the CPU type for the emulator 136. In other embodiments, multiple transformation modules 139 may be used, each specific to a particular CPU emulator 136.

Once the transformation module 139 has transformed native code present in the application package file 121, then at box 421 the streaming emulation service 142 emulates the requested application using the transformed code in the transformed application package file 127 (FIG. 1). When the emulated application is finished executing, the process of FIG. 4 is complete.

If, however, it is determined at box 415 that the application package file 121 does not match a CPU emulator 136, then processing continues at box 424. Box 424 is thus reached when the processor required by the application file does not match the host processor of the computing device 103 or a CPU emulator 136 on the computing device 103. In such case, the streaming emulation service 142 returns an error to the requesting client device 106, and the process of FIG. 4 is complete.

Although the embodiment illustrated in FIG. 4 performs the transformation of native code in response to a request for streaming execution of an application, other embodiments may perform the transformation before such a request. For example, the transformation module 139 may be invoked after a developer uploads or otherwise provides an application for use with the streaming emulation service 142. The transformation can thus be performed once, as part of the ingestion process, and used multiple times. This allows any performance cost associated with the translation process to be spread across many users.

Figure 5:
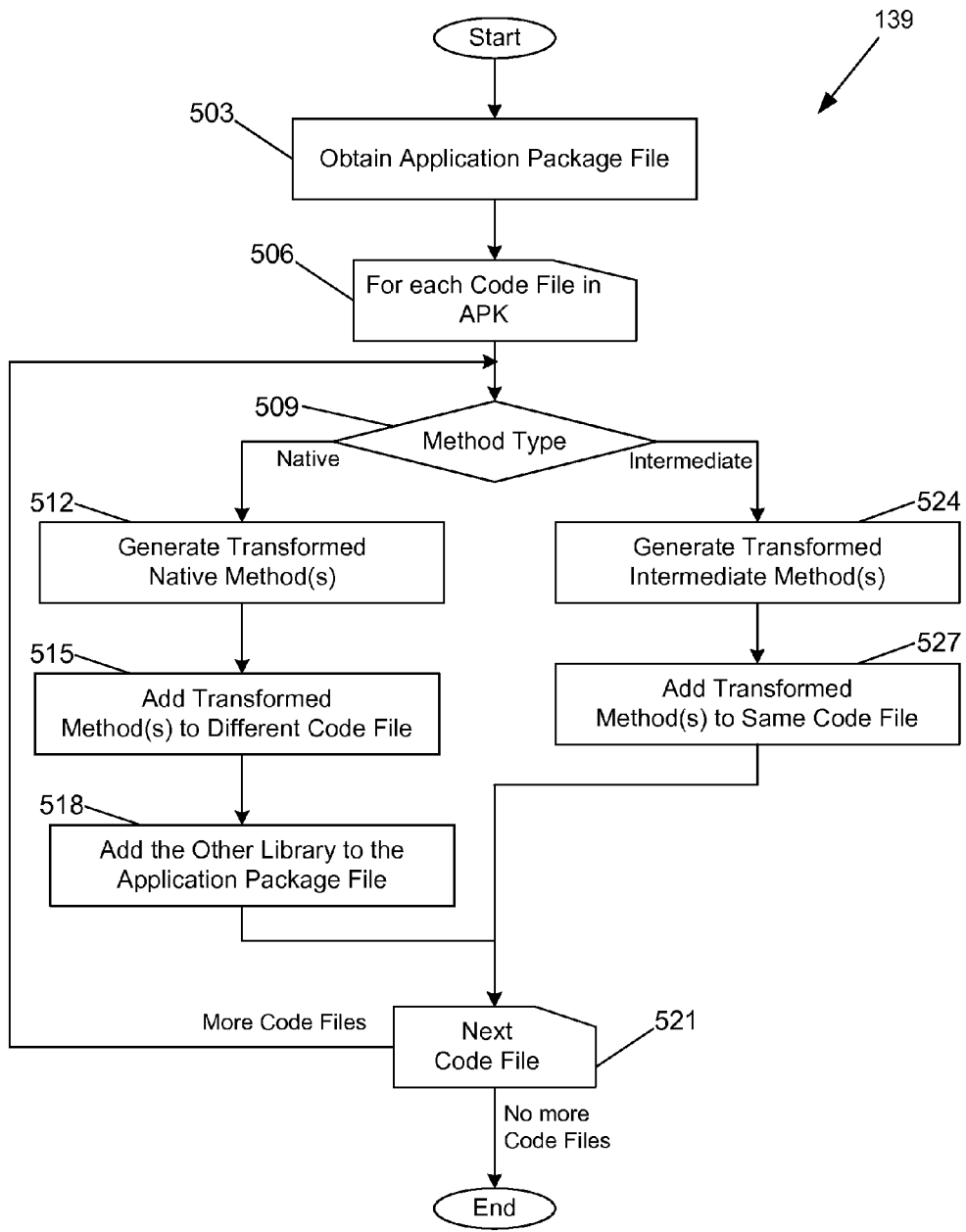
FIG. 5 is a flowchart illustrating an example of functionality implemented as portions of a transformation module executed in a computing device in the networked environment of FIG. 1 according to various embodiments of the present disclosure.

Turning now to FIG. 5, shown is a flowchart that provides one example of the operation of a portion of the transformation module 139 according to various embodiments. It is understood that the flowchart of FIG. 5 provides merely an example of the many different types of functional arrangements that may be employed to implement the operation of the portion of the transformation module 139 as described herein. As an alternative, the flowchart of FIG. 5 may be viewed as depicting an example of steps of a method implemented in the computing device 103 (FIG. 1) according to one or more embodiments.

Beginning at box 503, the transformation module 139 obtains an application package file 121 from the data store 112. Next, at box 506, the transformation module 139 begins an iteration loop to process any code modules within the application package file 121. These code modules may take the form, for example, of native code packaged in a shared library, of intermediate code packaged in a class library, of object or binary code, as well as other forms of code. At box 509, the transformation module 139 determines whether the code module currently being processed includes native code or intermediate code. As explained above, native code is specific to a particular hardware platform and/or processor.

If it is determined at box 509 that the current code module includes one or more native methods, the transformation module 139 moves to box 512. At box 512, the transformation module 139 generates a transformed native method for native methods in the current code module. In some embodiments, the transformation involves generating code that invokes a CPU emulator 136, as described above. In other embodiments, the transformation involves a binary translation of instructions that are specific to the processor required by the application into instructions that are specific to the host processor of the computing device 103. For example, if the application to be emulated includes code for an ARM processor and the host processor of the device 103 is an Intel® x86 processor, then the transformation at box 512 may process native methods in the current code module to translate the ARM instructions to x86 instructions.

Next, at box 515, the transformation module 139 adds the transformed native method(s) to a new shared library, one that contains transformed replacement code modules 124 rather than the original native code modules 115. At box 518, the transformation module 139 adds the new shared library to the application package file 121, thus producing a transformed application package file 127. Processing then continues at box 521, where the transformation module 139 continues the iteration loop by retrieving the next code module in the application package file 121.

If, however, it is determined at box 509 that the current code module contains intermediate code, the transformation module 139 continues at box 524, where the transformation module 139 generates transformed intermediate methods for methods in the current code module. For example, when the intermediate code module includes code that invokes native methods, then the invocation may be transformed to reorder parameters passed to the native method.

At box 527, the transformation module 139 replaces the original intermediate method(s) in the current intermediate code module with the transformed intermediate method(s). Processing then continues at box 521, where the transformation module 139 continues the iteration loop by retrieving the next code module in the application package file 121.

When all code modules have been processed, the iteration loop ends. Having generated a transformed application package file 127 from the original application package file 121, the process of FIG. 5 is complete. Otherwise, the transformation module 139 continues processing with the next code module at the top of the iteration loop, box 509.

The embodiment described in connection with FIG. 5 transformed intermediate code modules as well as native code modules. In another embodiment, only native code modules are transformed. In yet another embodiment, only intermediate code modules are transformed.

Figure 6:
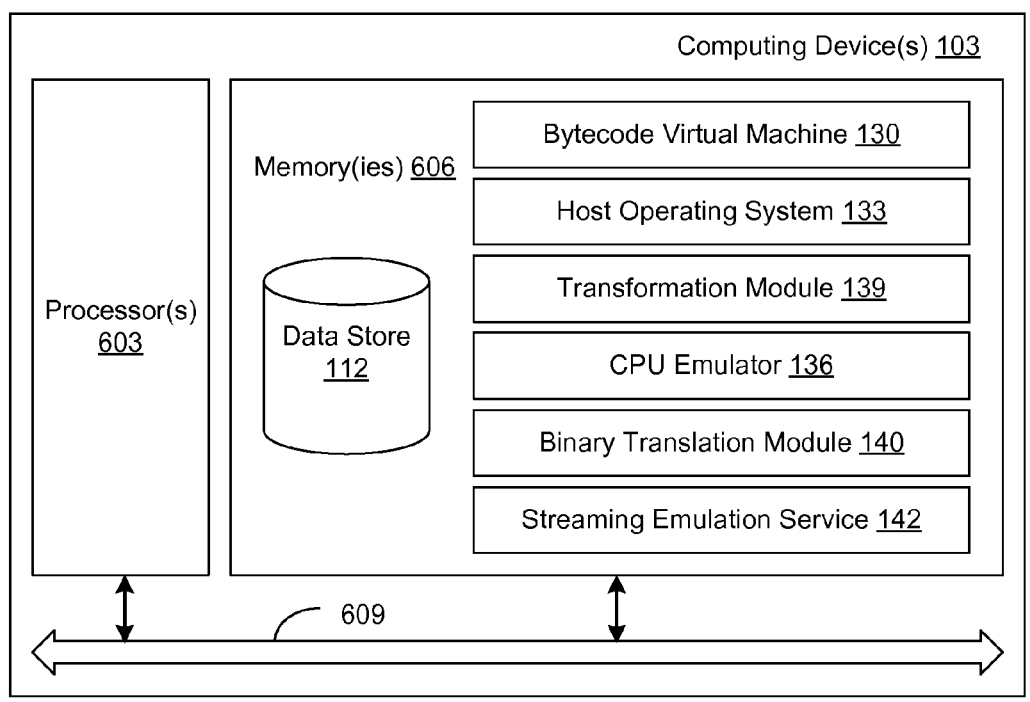
FIG. 6 is a schematic block diagram that provides one example illustration of a computing device employed in the networked environment of FIG. 1 according to various embodiments of the present disclosure.

Moving on to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the CPU emulator 136, the bytecode virtual machine 130, the transformation module 139, streaming emulation service 142, and potentially other applications. Also stored in the memory 606 may be a data store 112 and other data. In addition, an operating system may be stored in the memory 606 and executable by the processor 603. While not illustrated, the client device 106 also includes components like those shown in FIG. 6, whereby the browser 148 is stored in a memory and executable by a processor.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors and the memory 606 may represent multiple memories that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the transformation module 139 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the transformation module 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the transformation module 139, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method implemented in a computing device, the method comprising:
 ingesting, by the computing device, an application package file including native object code in a shared library and intermediate code, the native object code being specific to a hardware platform and the intermediate code being agnostic with respect to the hardware platform;
 identifying, by the computing device, one or more native methods in the shared library;
 transforming, by the computing device, the one or more native methods in the shared library to produce replacement object code, wherein the replacement object code, when executed on the computing device, invokes an emulator for the identified hardware platform to emulate the native object code, the transforming comprising:
  generating, by the computing device, one or more transformed native methods corresponding to the identified one or more native methods, the one or more transformed native methods invoking the emulator for the hardware platform to emulate the one or more native methods; and adding the one or more transformed native methods to another shared library.

2. The method of claim 1, wherein the transforming does not transform intermediate code.

3. The method of claim 1, wherein the shared library uses Executable and Linkable Format (ELF).

4. The method of claim 1, wherein the replacement object code obtains a result returned from an invocation of the emulator and returns the result to a virtual machine that is executing the replacement object code.

5. The method of claim 1, wherein the replacement object code also passes at least one parameter to the emulator, wherein the at least one parameter is obtained from a virtual machine that is executing the replacement object code.

6. The method of claim 1, wherein the replacement object code, when executed on the computing device, also causes the emulator to:
load the native object code;
emulate one or more processor instructions in the native object code; and
provide a result of the emulated one or more processor instructions to the replacement object code.

7. The method of claim 1, wherein generating one or more transformed native methods further comprises, for individual ones of the one or more transformed native methods:
generating a stub native method having a same name as a corresponding native method;
adding, to the stub native method, code that loads the corresponding native method from the shared library, thus producing the transformed native method;
adding, to the transformed native method, code that invokes the emulator for the hardware platform to emulate the corresponding native method; and
adding, to the transformed native method, code that provides a result of one or more emulated processor instructions to a caller of the transformed native method.

8. The method of claim 1, further comprising:
transforming, by the computing device, the intermediate object code to produce replacement intermediate code.

9. The method of claim 8, wherein the transformed intermediate code reorders a parameter passed from the intermediate code to a native method.

10. The method of claim 1, further comprising generating a transformed application package file to include the replacement code.

11. The method of claim 10, wherein generating transformed application package file further comprises adding the another shared library to the application package file.

12. The method of claim 1, wherein the native object code comprises object code and the intermediate code comprises bytecode.

13. A non-transitory computer-readable medium embodying a program executable in a computing device, the program comprising:
code that obtains an application package file including native code in a shared library and intermediate code, the native code being specific to a hardware platform and the intermediate code being agnostic with respect to the hardware platform;
code that identifies one or more native methods in the shared library;
code that transforms the one or more native methods in the shared library to produce replacement code, wherein the replacement code, when executed on the computing device, invokes an emulator for the hardware platform to emulate the native code; and
code that generates a transformed application package file to include the intermediate code and the replacement code,
wherein the code that transforms further comprises:
code that generates one or more transformed native methods corresponding to the identified one or more native methods, wherein the one or more transformed native methods invoke the emulator for the hardware platform to emulate the identified one or more native methods;
code that adds the one or more transformed native methods to another shared library; and
code that adds the another shared library to the application package file to produce a transformed application file.

14. The non-transitory computer-readable medium of claim 13, wherein the shared library uses Executable and Linkable Format (ELF).

15. A system, comprising:
at least one computing device; and
an application implemented in the at least one computing device, the application comprising:
logic configured to obtain an application package file including native code in a shared library and intermediate code, the native code being specific to a hardware platform and the intermediate code being agnostic with respect to the hardware platform;
logic that identifies one or more native methods in the shared library;
logic configured to transform the one or more native methods to produce replacement code, wherein the replacement code invokes an emulator for the hardware platform to emulate the native code, comprising:
logic that generates one or more transformed native methods corresponding to the identified one or more native methods, wherein the one or more transformed native methods invoke the emulator for the hardware platform to emulate the identified one or more native methods;
logic that adds the one or more transformed native methods to another shared library; and
logic configured to generate a transformed application package file to include the intermediate code and the replacement code.

16. The system of claim 15, wherein the native code comprises object code and the intermediate code comprises bytecode.

17. The system of claim 15, the logic configured to transform further comprising:
logic configured to parse the shared library; and
logic configured to produce, from the shared library, the replacement code the another shared library.

18. The system of claim 15, the application further comprising:
logic that adds the replacement code to the application package file to produce the transformed application package.

19. The system of claim 18, the logic that adds further comprising:
logic that creates a replacement code folder in the application package file, the replacement code folder having a name based on the hardware platform; and
logic that adds the replacement code to the replacement code folder of the application package file to produce the transformed application package.

20. The system of claim 15, the application further comprising:

logic configured to transform the intermediate code to produce transformed intermediate code that reorders a parameter passed from the intermediate code to a native method.

21. The system of claim 15, wherein the logic configured to generate the transformed application package file further comprises logic that adds the another shared library to the application package file.

* * * * *